United States Patent [19]
Barnes et al.

[11] 3,808,040
[45] Apr. 30, 1974

[54] METHOD OF MANUFACTURING BATTERY PLATE GRIDS

[76] Inventors: Stanley Charles Barnes, Coleridge House, 213 Queslett Rd., Great Barr, Birmingham; Kenneth Barratt, "Dene House" Lavender Hall Rd., Berkswell, Warwickshire, both of England

[22] Filed: Mar. 30, 1972

[21] Appl. No.: 239,597

[30] Foreign Application Priority Data
May 15, 1971 Great Britain.................. 15172/71

[52] U.S. Cl................... 117/212, 117/21, 117/24, 117/28, 117/44, 117/228, 117/229, 117/230, 136/75, 156/167, 156/177
[51] Int. Cl........................ B44d 1/09, B44d 1/094
[58] Field of Search............. 117/212, 229, 230, 44, 117/119.6, 21, 24, 28, 228; 136/66, 75; 264/171; 156/167, 177

[56] References Cited
UNITED STATES PATENTS

| | | | |
|---|---|---|---|
| 3,607,412 | 9/1971 | Holloway | 136/66 |
| 3,280,448 | 10/1966 | Brajer | 117/212 |
| 2,873,219 | 2/1959 | Brennan | 117/229 |
| 2,979,424 | 4/1961 | Whitehurst et al. | 117/229 |
| 1,819,041 | 8/1931 | Sherman | 117/44 |
| 3,336,151 | 8/1967 | Shirley et al. | 117/44 |

*Primary Examiner*—Daniel J. Fritsch
*Attorney, Agent, or Firm*—Holman & Stern

[57] ABSTRACT

A method of manufacturing battery plate grids including the steps of feeding an elongated strip of fibrous tissue onto a moving support, and feeding synthetic resin material onto the moving tissue to produce a first set of ribs, and feeding further synthetic resin material from a moving feeder to produce further ribs at an angle to the first set of ribs. The synthetic resin material is either fed in molten form, and allowed to solidify to produce the ribs, or alternatively fed in powdered form and heated to cause the powdered synthetic resin material to coalesce to form the ribs. The continuous strip of fibrous tissue carrying the ribs is then divided to produce a plurality of grids each including a synthetic resin lattice structure supporting a sheet of fibrous tissue.

10 Claims, 1 Drawing Figure

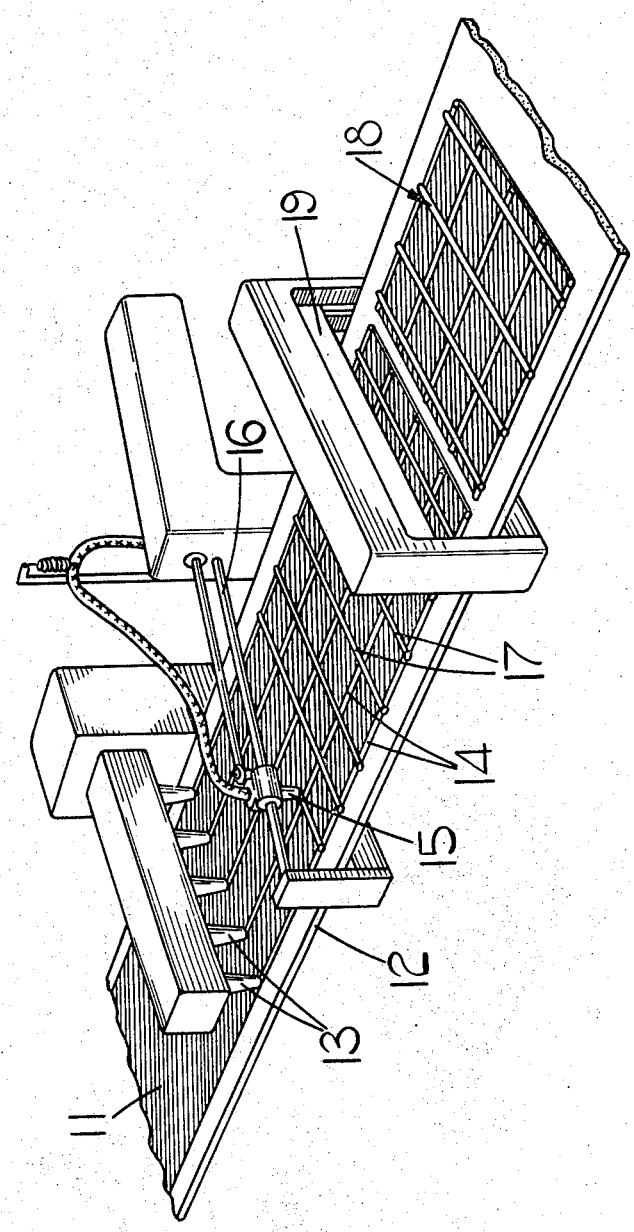

METHOD OF MANUFACTURING BATTERY PLATE GRIDS

This invention relates to a method of manufacturing battery plate grids.

A method, according to the invention, comprises the steps of:

a. feeding an elongated strip of fibrous tissue onto a moving support so that the strip moves with the support and the longitudinal axis of the strip is parallel with the direction of movement of the support, b. passing the strip below a first set of transversely spaced feeders and feeding molten synthetic resin material from the feeders onto the strip so as to produce on the strip, after solidification of the synthetic resin material, a first set of parallel, spaced ribs, c. passing the strip below a second feeder which moves across the support and feeding molten synthetic resin material from the moving feeder onto the strip so as to produce on the strip, after solidification of the synthetic resin material a second set of parallel, spaced ribs, the arrangement being such that the ribs of the second set are inclined at an angle to the ribs of the first set, and d. dividing the ribbed strip to produce a plurality of grids each including a synthetic resin lattice structure supporting a sheet of the fibrous tissue.

Preferably, the synthetic resin material is polyvinyl chloride.

Preferably, the strip of fibrous tissue fed onto the support includes electrically conductive material, so that the finished grids are electrically conductive.

Conveniently, electrically conductive material is provided within the strip of fibrous tissue by forming the tissue of conductive fibres, or of non-conductive fibres coated with conductive material, or of partially burnt, organic non-conductive fibres, the partial burning of the organic fibres producing conductive material on the fibres.

Conveniently, electrically conductive material is provided on the strip of fibrous tissue by forming the tissue of non-conductive fibres and applying conductive material to the tissue.

Alternatively, the method includes the further step of applying electrically conductive material to the sheet of fibrous tissue supported by the lattice structure of each grid so as to render the grids conductive.

Preferably, the method also includes the step of providing each of the grids with an electrically conductive, battery plate lug.

The accompanying drawing is a diagrammatic illustration of a method of manufacturing battery plate grids according to one example of the invention.

Referring to the drawing, in one example of the invention it is required to manufacture battery plate grids formed of polyvinyl chloride for use in electric storage batteries. The method of producing the grids comprises feeding a strip 11 of a fibrous tissue onto a moving, stainless steel conveyor belt 12, electrically conductive material being contained by the strip 11 of fibrous tissue. The conductive material can be provided within the strip 11 of fibrous tissue by forming the tissue of conductive fibres, or of non-conductive fibres coated with conductive material, or of partially burnt fibres of an organic, non-conductive material, such as the polyester known as terylene, the fibres being arranged so that the partial burning produces the electrically conductive material on the fibres. Alternatively the conductive material can be provided on the strip 11 by forming the tissue of non-conductive fibres and then applying, such as for example by spraying, electrically conductive material onto the tissue. In one particular example the strip 11 is composed of a tissue of lead coated glass fibres.

The strip 11 is fed onto the conveyor belt 12 so that the longitudinal axis of the strip is parallel with the direction of movement of the belt 12 and the strip is moved by the belt under a first set of feeders 13. The feeders 13 are spaced equal distances apart in a direction extending transverse to the direction of movement of the belt 12 and molten polyvinyl chloride is fed from the feeders onto the strip 11. Thus as the strip passes from the feeders 13, and after solidification of the polyvinyl chloride, a first set of parallel, spaced ribs 14 are formed on the strip 11.

The strip 11 then passes beneath a second feeder 15 which moves along a support 16 back and forth over the strip 11. The feeder 15 is arranged so that as the feeder moves in one direction across the strip 11 molten polyvinyl chloride is fed from the feeder onto the strip, the supply of molten polyvinyl chloride from the feeder being stopped during the return movement of the feeder. In this way, after solidification of the polyvinyl chloride, a second set of parallel, spaced ribs 17 are formed on the strip 11, the spacing between adjacent ribs 17 being determined by the speed of return movement of the feeder 15. In one particular example, it is required that the ribs 17 should extend perpendicular to the ribs 14, and it is to be appreciated that the direction of movement of the feeder 15 relative to the direction of movement of the belt 12, and the speeds of movement of the belt 12 and the feeder 15, must be carefully controlled if the required perpendicular relationship between the ribs 14 and 17 is to be obtained.

The strip 11 with the ribs 14, 17 thereon is then fed beneath a cutter 19 which divides into a plurality of individual grids 18. Thus each grid 18 comprisea a polyvinyl chloride lattice structure supporting a sheet of the fibrous material, conductive material being contained by the sheet of fibrous material so that the grid 18 is conductive. As a final step (not shown) a conductive, battery plate lug is pressed onto each grid 18.

In a modification of the above example, the fibrous tissue of the strip 11 is composed of non-conductive fibres without the provision of any conductive material on the fibres of the tissue. Then, after formation of the grids 18, the sheet of fibrous tissue supported by the lattice structure of each grid is provided with conductive material by, for example, spraying the conductive material onto the sheet.

In a further modification, the polyvinyl chloride fed onto the strip 11 by the feeders 13, 15 is in powder form and the strip 11, supporting the powdered polyvinyl chloride ribs 14, 17, is passed through an oven (not shown) which sinters the ribs before the ribbed strip is divided up by the cutter 19.

We claim:

1. A method of manufacturing battery plate grids comprising the steps of:

a. feeding an elongated strip of fibrous tissue onto a moving support so that the strip moves with the support and the longitudinal axis of the strip is parallel with the direction of movement of the support, b. passing the strip below a first set of transversely spaced feeders and feeding molten synthetic resin material from the feeders onto the strip so as to produce on the strip, after solidification of the synthetic resin material, a first set of parallel, spaced ribs, c. passing the strip below a second feeder which moves across the support and feeding molten synthetic resin material from the moving feeder onto the strip so as to produce on the strip, after solidification of the synthetic resin material a second set of parallel, spaced ribs, the arrangement being such that the ribs of the second set are inclined at an angle to the ribs of the first set, and d. dividing the ribbed strip to produce a plurality of grids each including a synthetic resin lattice structure supporting a sheet of the fibrous tissue.

2. A method of manufacturing battery plate grids comprising the steps of:

a. feeding an elongated strip of fibrous tissue onto a moving support so that the strip moves with the support and the longitudinal axis of the strip is parallel with the direction of movement of the support, b. passing the strip below a first set of transversely spaced feeders and feeding powdered synthetic resin material from the feeders onto the strip so as to produce on the strip, after solidification of the synthetic resin material, a first set of parallel, spaced ribs, c. passing the strip below a second feeder which moves across the support and feeding powdered synthetic resin material from the moving feeder onto the strip so as to produce on the strip, after solidification of the synthetic resin material a second set of parallel, spaced ribs, the arrangement being such that the ribs of the second set are inclined at an angle to the ribs of the first set, d. subjecting the synthetic resin material to heat to unite the particles of synthetic resin material, and, e. dividing the ribbed strip to produce a plurality of grids each including a synthetic resin lattice structure supporting a sheet of the fibrous tissue.

3. A method as claimed in claim 1 wherein the synthetic resin material is polyvinyl chloride.

4. A method as claimed in claim 1 wherein the strip of fibrous tissue fed to said support contains electrically conductive material so that the finished grids are electrically conductive.

5. A method as claimed in claim 4 wherein the electrically conductive material is provided within the fibrous tissue by forming the tissue from electrically conductive fibres.

6. A method as claimed in claim 4 wherein the electrically conductive material is provided within the fibrous tissue by forming the tissue from non-conductive fibres coated with conductive material.

7. A method as claimed in claim 4 wherein the electrically conductive material is provided within the fibrous tissue by forming the tissue from partially burnt, organic, non-conductive fibres, the partial burning of which produces conductive material on the fibres.

8. A method as claimed in claim 4 wherein the conductive material of the strip of fibrous tissue is provided on the tissue by forming the tissue from non-conductive fibres and then applying the conductive material to the tissue.

9. A method as claimed in claim 1 including the further step of rendering the grids conductive by applying electrically conductive material to the fibrous tissue supported by the lattice structure of the ribs.

10. A method as claimed in claim 9 wherein the step of applying the conductive material is performed prior to the step of dividing the ribbed strip.

* * * * *